June 30, 1959  L. P. SMELTZER  2,892,593
AMBULANT LAND WORKING AND IRRIGATING APPARATUS
Filed April 30, 1956  7 Sheets-Sheet 2
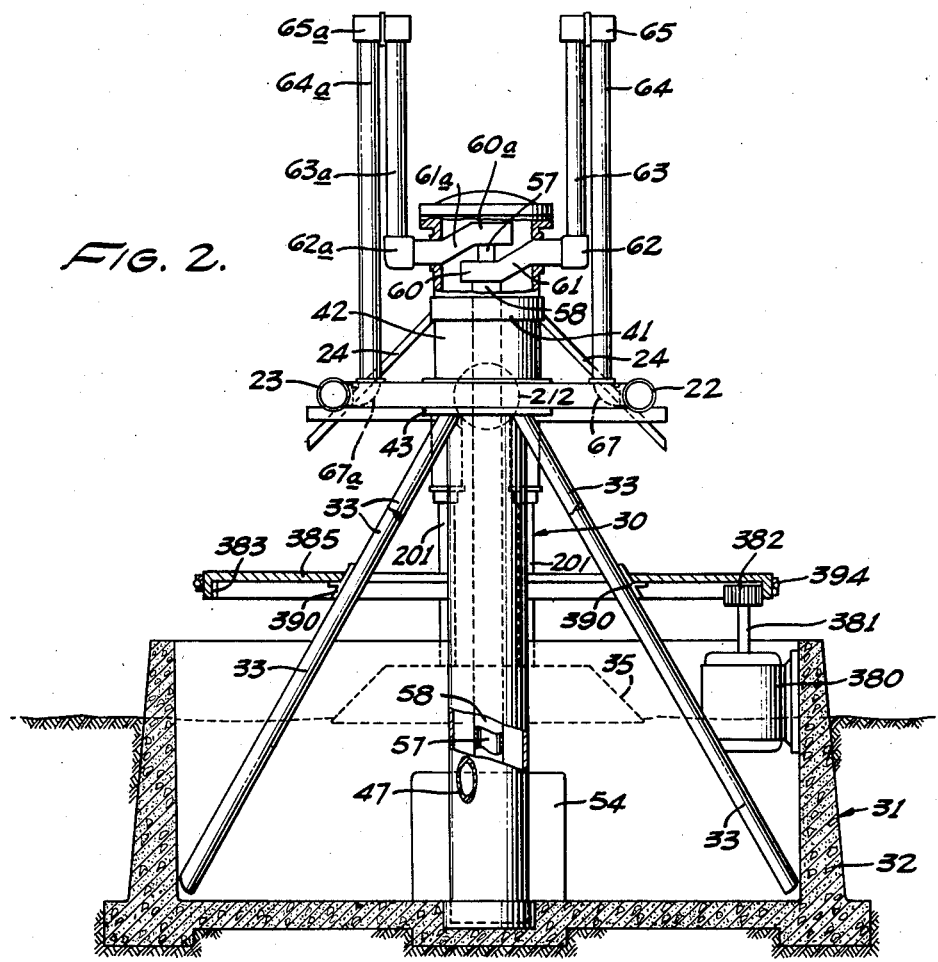
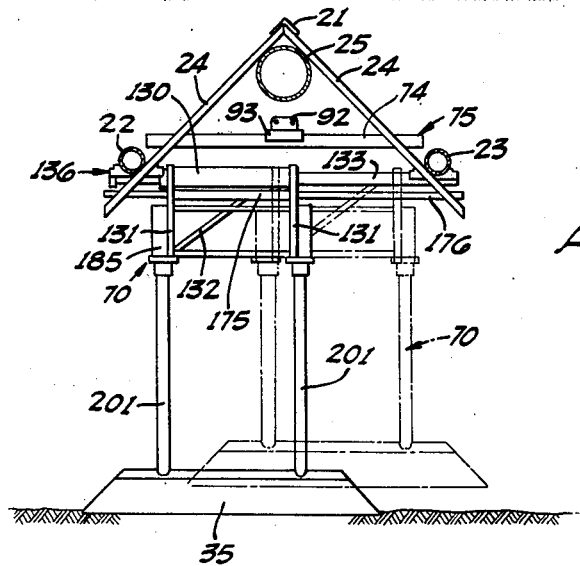
LOUIS P. SMELTZER
INVENTOR.
BY
ATTORNEYS

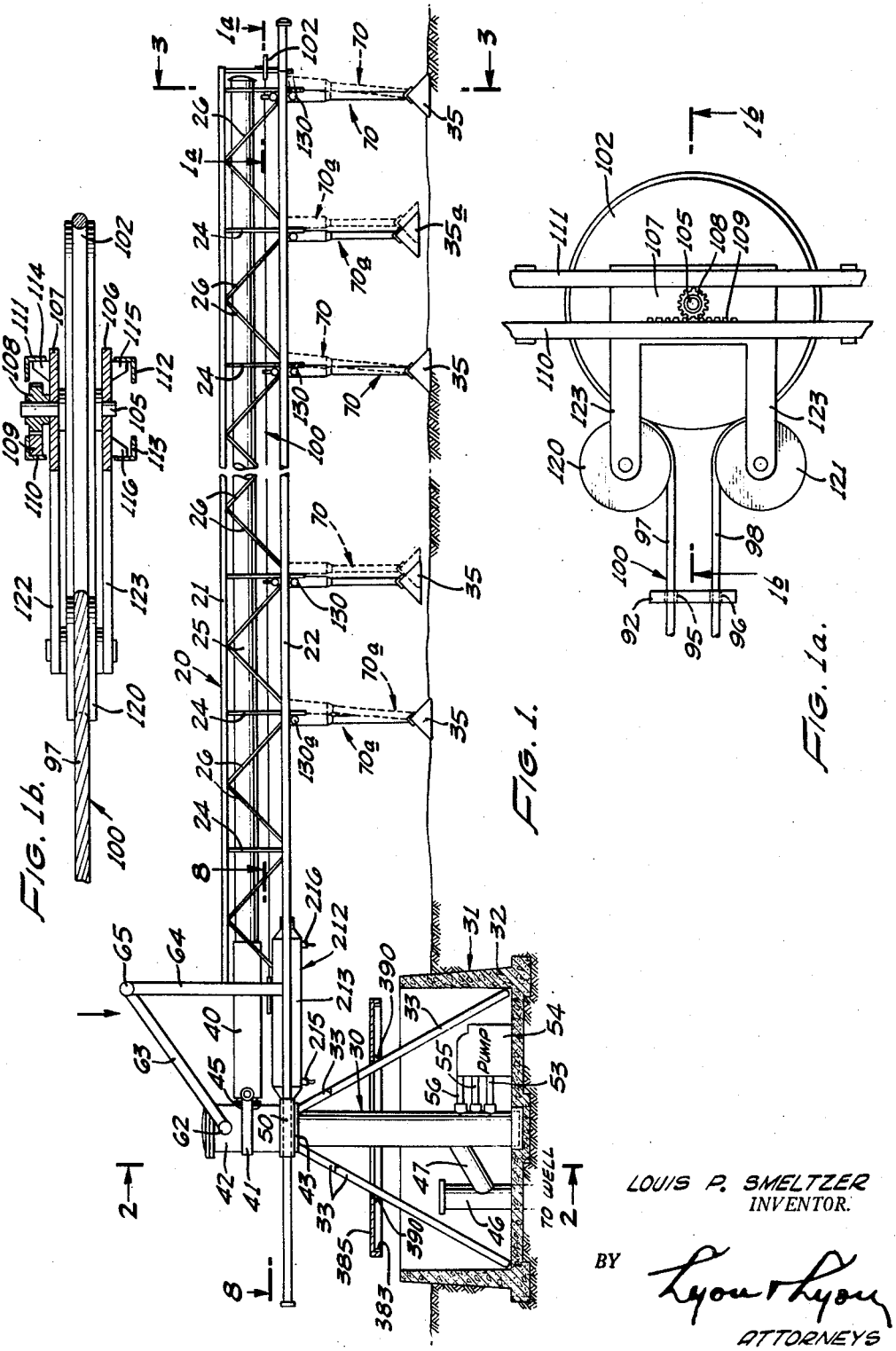

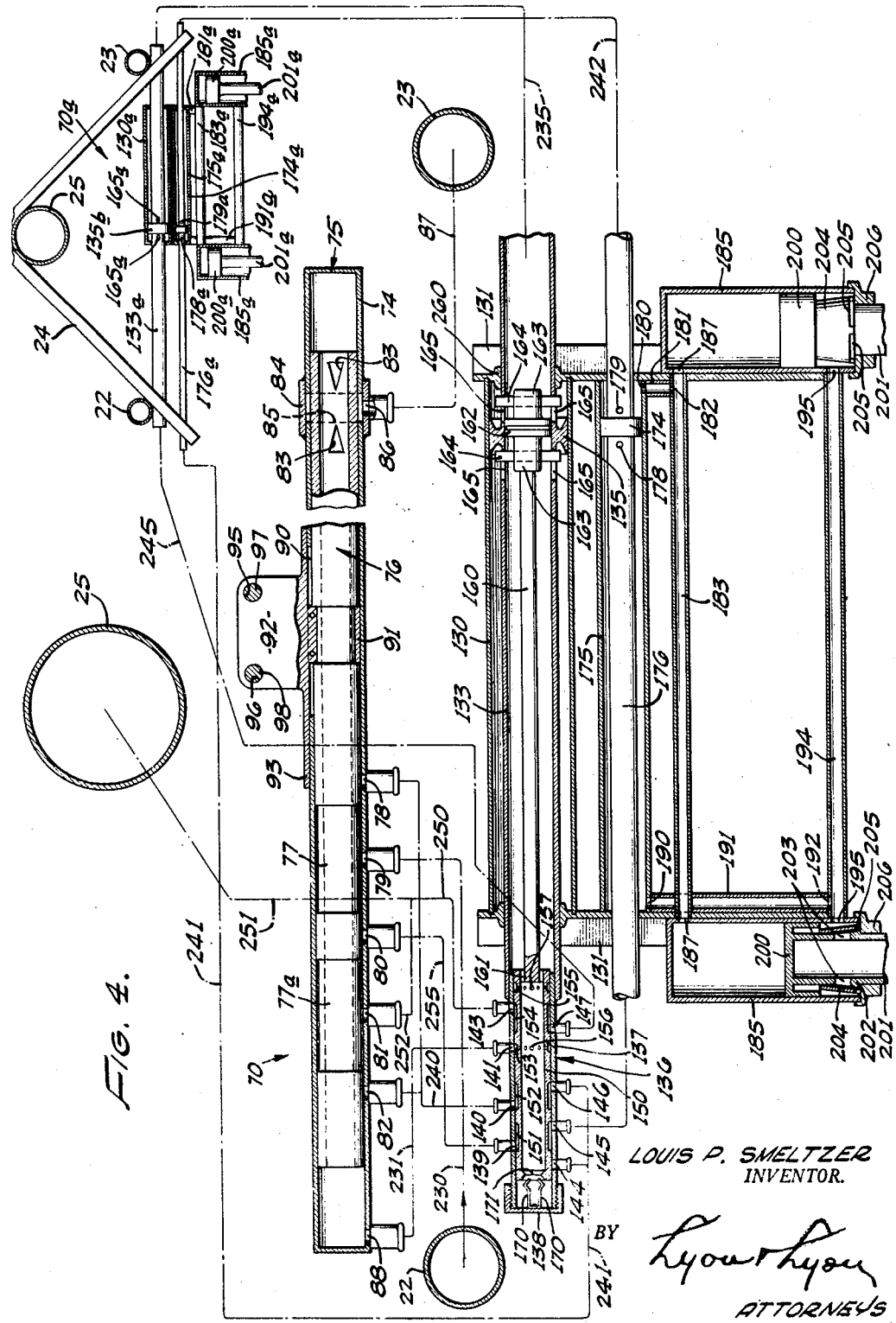

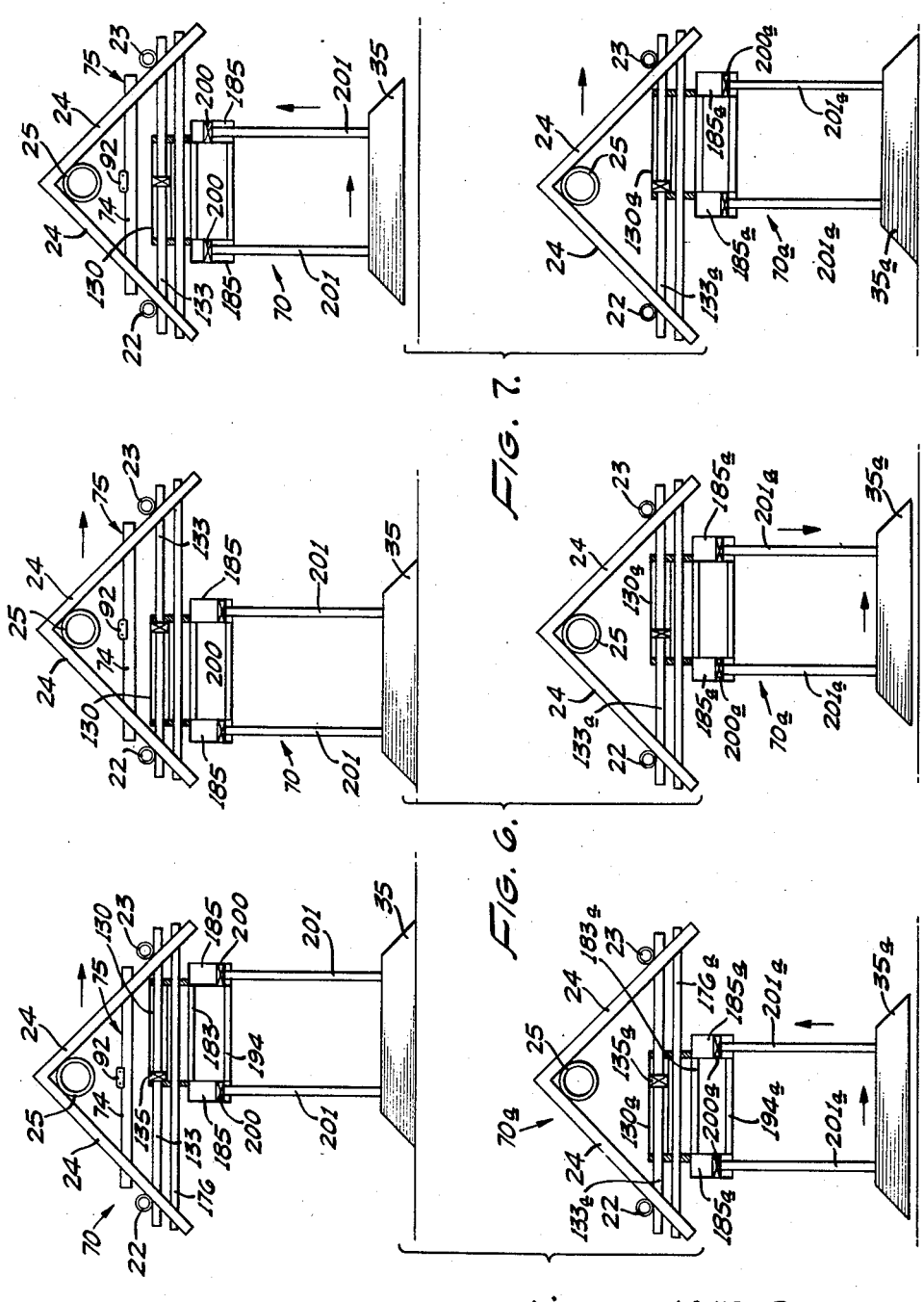

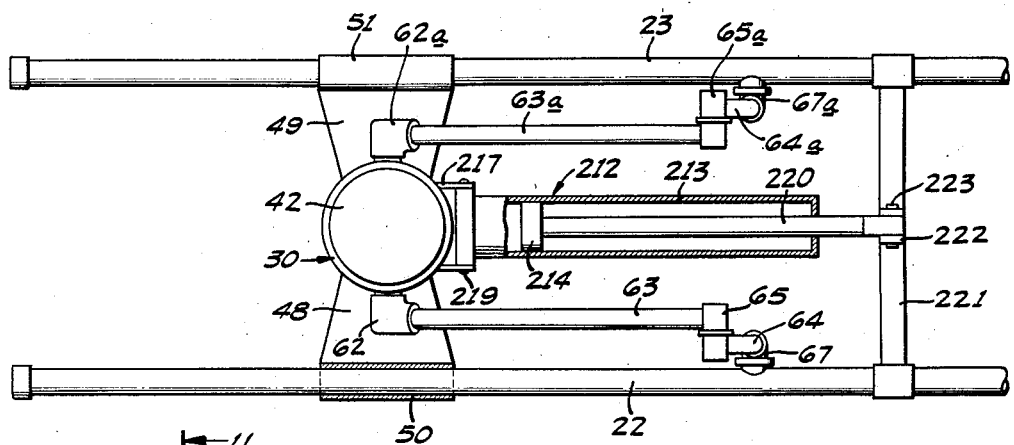
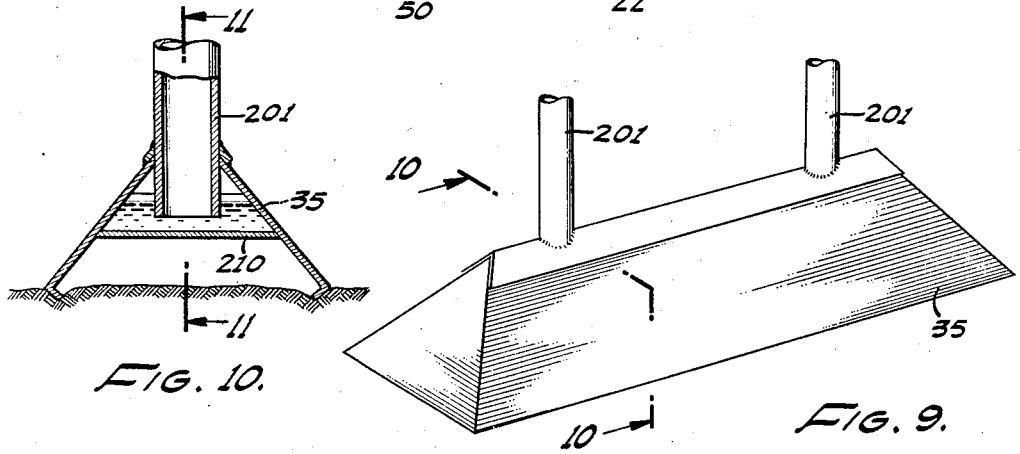
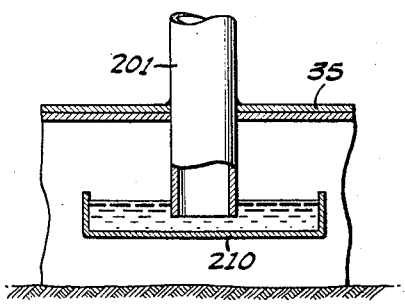

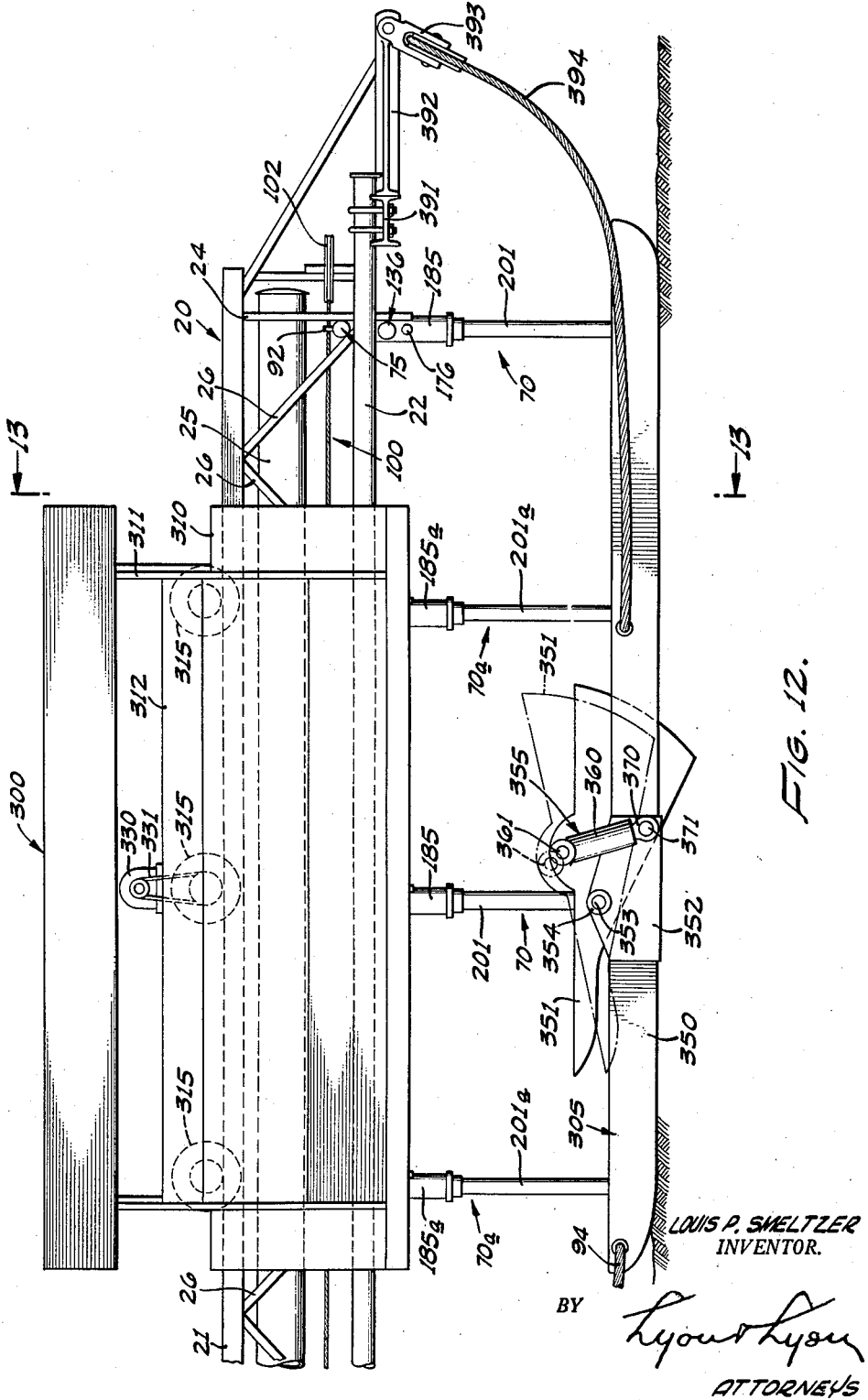

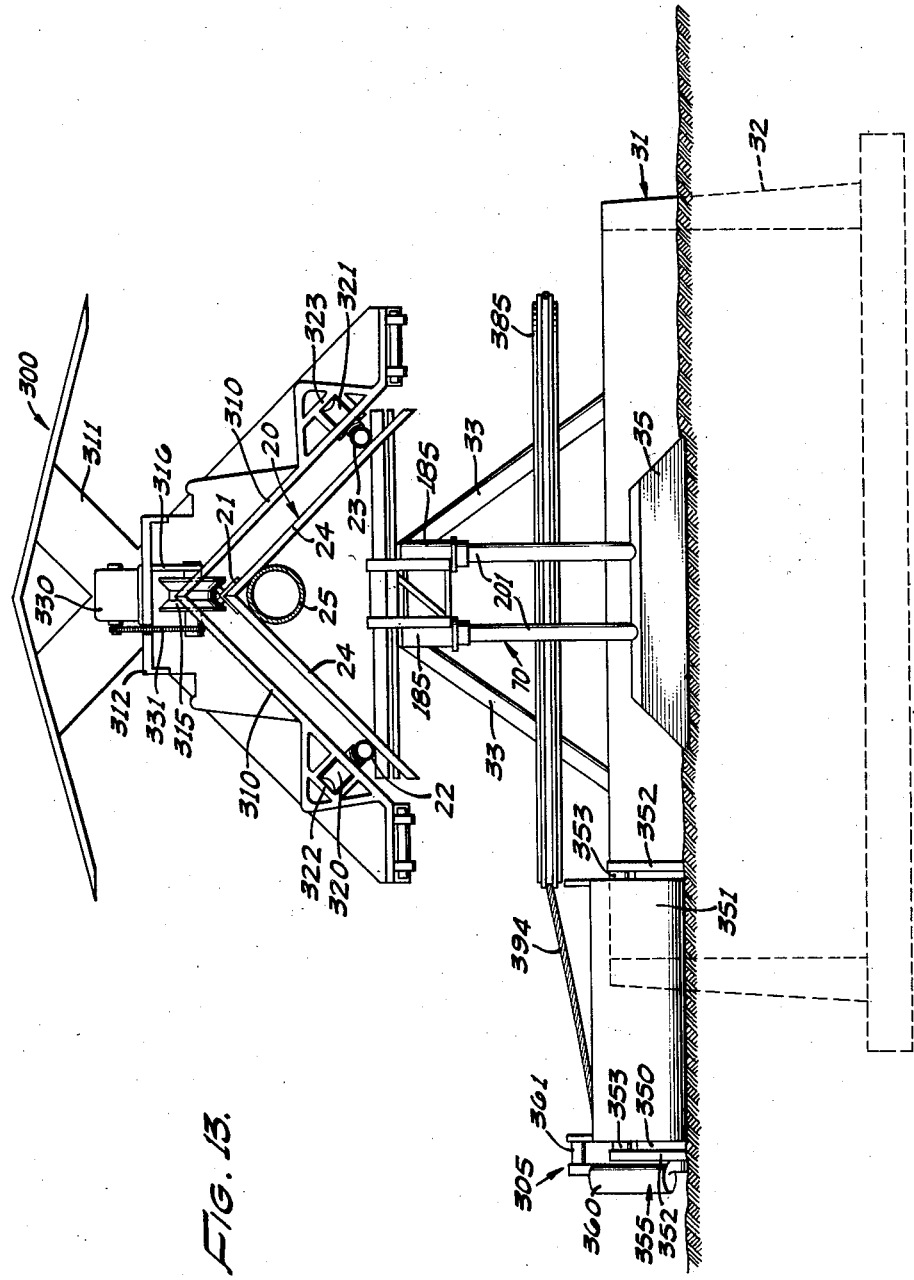

United States Patent Office 2,892,593
Patented June 30, 1959

2,892,593
AMBULANT LAND WORKING AND IRRIGATING APPARATUS

Louis P. Smeltzer, Los Angeles, Calif.

Application April 30, 1956, Serial No. 581,428

7 Claims. (Cl. 239—177)

This invention relates to agricultural implements and has particular reference to an apparatus for tilling arid, wind-swept, sandy soils where water is not only scarce but where the excessive use of the same contributes materially to the alkali damage caused by the salts left behind by many types of impure irrigation waters.

The primary object of this invention is to provide a novel apparatus for the application of irrigation water, plant nutrients and other agricultural materials to the soil.

Another object of this invention is to provide an automatically guided, rotatable and extensible trestle-like apparatus supported on ground-contacting floats as opposed to surface churning wheels or continuous tracks, and capable of carrying and distributing, by sprinkling into the air and onto growing plants or by direct application to the soil under normal or higher pressures, irrigation water from a centrally located source.

It is another object of this invention to provide a radially rotatable trestlework structure including a carriage movable thereon for transportation of workmen, produce, plants, seeds, field waste and miscellaneous materials between an essentially fixed end of the trestlework and each part of the circular land area over which the apparatus moves.

Another object of this invention is to provide an economical means of automatically, or with a minimum of labor, applying nutrient solutions for feeding plant roots; gaseous fluids such as carbon dioxide to speed up photosynthesis and hence the growth rate of the plants; and liquids and other fluids in an electrically charged, ionized or neutral state for a combination of the above purposes or to control plant diseases and pests.

Another object of this invention is to provide automatic or semi-automatic means for distributing from a central location to each part of a generally circular area a heat-carrying fluid or chemical such as hot water or steam for the purpose of maintaining soil and plant temperatures at optimum levels during periods of inclement weather.

Still another object of this invention is to provide an apparatus from which earth cleaning, leveling and conditioning equipment such as rakes, discs, scrapers and plows can be effectively guided and operated, and in combination with which other apparatus may be utilized to save labor in the planting, cultivating, harvesting, and packing of various types of field crops.

Other objects and advantages of this invention, it is believed, will be readily apparent from the following detailed description of preferred embodiments thereof when read in connection with the accompanying drawings.

In the drawings:

Figure 1 is a side elevation, partly in section, of a preferred form of the apparatus of this invention.

Figure 1a is a fragmentary enlarged sectional elevation taken substantially on the line 1a—1a of Figure 1.

Figure 1b is a fragmentary sectional elevation taken substantially on the line 1b—1b of Figure 1a.

Figure 2 is a sectional enlarged elevation taken substantially on the line 2—2 of Figure 1.

Figure 3 is a sectional enlarged elevation taken substantially on the line 3—3 of Figure 1.

Figure 4 is a schematic view illustrating the power and control system for operation of the master and slave trestle units.

Figures 5, 6 and 7 are sequential diagrammatic views similar to Figure 3 but illustrating the respective relationship between master and slave units during operation thereof.

Figure 8 is a sectional enlarged elevation taken substantially on the line 8—8 of Figure 1.

Figure 9 is a perspective enlarged view of one of the supporting feet or float members.

Figure 10 is a sectional elevation taken substantially on the line 10—10 of Figure 9.

Figure 11 is a sectional elevation taken substantially on the line 11—11 of Figure 10.

Figure 12 is a fragmentary side elevation of a modified form of apparatus.

Figure 13 is a sectional view taken substantially on the line 13—13 of Figure 12.

Referring now to the drawings, the apparatus of this invention includes a semi-rigid trestlework generally indicated 20, which may be formed of a longitudinal top rail or frame member 21, a pair of combined bottom fluid conduits and structural members 22 and 23, a plurality of inclined, transverse frame members 24 extending downwardly and outwardly from each side of the rail 21, the lower portions thereof being connected to said conduits 22 and 23, an upper fluid conduit 25, and a plurality of angularly inclined brace members 26 extending between the top rail 21 and the bottom conduits 22 and 23. The trestlework is operably connected at one end thereof to a vertical pivot post 30 which is anchored in a pit 31 by means of a suitable foundation 32 and braces 33. The trestlework is supported for pivotal movement in a generally horizontal plane about the pivot post by means of a plurality of ground contacting feet or float members 35 and 35a suitably connected to the trestlework proper and operable relative thereto as will be fully described below.

The inner end of the upper conduit 25 telescopes into a tubular element 40 which is secured, by means of an anchor strap 41, to a hollow cylindrical cap member 42. The member 42 is in turn mounted for rotation coaxially with the pivot post 30 and is in communication therewith for the flow of fluid therebetween, a sealed bearing 43 being provided to permit rotation of the member 42 without leakage of fluid between the pivot post and the cap member. The interior of the tubular element 40 communicates with the interior of the cap member 42 through a bellows section 45 which is provided to compensate for vertical movement of the trestlework due to irregularities in the ground being worked. A water wellhead 46 is positioned in the pit 31 and a conduit 47 leads therefrom into the interior of the pivot post for delivery of well water through the pivot post and cap member into the upper conduit 25.

As shown best in Figures 1 and 8, a pair of support plates 48 and 49 are provided, one extending horizontally from either side of the cap member 42, each of the plates carrying at the outer ends thereof one of a pair of sleeves 50, 51 through which extend the respective lower conduits 22 and 23. The inside diameters of the sleeves are appreciably larger than the outside diameters of the conduits so as to permit free sliding movement of the conduits therein and also to permit limited movement of the conduits in a vertical plane.

Means are provided for admitting pressure fluid, such as the water from the well, into the conduits 22 and 23 and, as shown in the drawings, these means may include a pump 54 having an inlet line 53 leading from the interior of the pivot post 30. A pair of outlet lines 55 and 56 lead from the pump into the pivot post, the line 55 communicating with a vertical pipe 57 and the line 56 communicating with a larger pipe 58 which is concentric with the pipe 57 (see Figure 2). The upper end of the pipe 58 is provided with a rotatable, suitably sealed fitting 60 carrying a conduit 61 which extends through an aperture in the cap element 42. A swivel elbow fitting 62 is connected to the outer end of the conduit 61 and is also connected to an inclined pipe 63, the upper end of which is operably connected to a generally vertical pipe 64 by means of a swivel elbow fitting 65. The lower end of the pipe 64 is operably connected to the lower conduit 22 by means of a swivel elbow fitting 67. The upper end of the pipe 57 extends through the fitting 60, a suitable fluid seal (not shown) being provided therebetween. The pipe 57 is operably connected to the lower conduit 23 in the same manner as described above in connection with the pipe 58 and lower conduit 22, being provided with a rotatable fitting 60a, elbow fitting 62a, conduit 61a, inclined pipe 63a, vertical pipe 64a and swivel elbow fitting 65a.

The foot members 35 and 35a each comprise the lowermost portion of one of a plurality of trestlework support and propulsion units 70 and 70a, respectively. As shown best in Figure 1, one of the units 70 is positioned at the outer end of the trestlework. The units 70 and 70a are paired together, each of the units 70 of each pair being a "master" or control unit and the unit 70a of each pair being a "slave" unit as will be explained hereinafter.

Referring now to Figures 3 and 4, each of the units 70 includes a control or throttle valve assembly generally indicated 75 comprising a cylinder 74 rigidly connected to the trestlework transversely thereof, as by securing the same to the frame members 24. A hollow piston 76 fits closely within the cylinder for longitudinal reciprocation therein, the piston being provided with a pair of portions 77 and 77a of reduced diameter for cooperation with a plurality of ports 78, 79, 80, 81 and 82 provided in the cylinder. Also comprising a portion of the control valve assembly is a metering valve comprising a pair of triangular-shaped ports 83 in the piston, and a sealing collar 84 encompassing the cylinder 74 in the area of a peripheral split 85 formed in the cylinder, the collar having a port 86 therein. A fluid line indicated by the phantom line 87 in Figure 4 leads from the conduit 23 to the port 86. A fluid outlet port 88 is provided at the other end of the cylinder 74 for cooperation with the metering valve as will be described below.

Means are provided for actuating the piston 76 and, as shown in Figures 3 and 4 of the drawings, these means include a longitudinal slot 90 in the top of the cylinder 74, a collar 91 secured to the piston 76 and extending through the slot, and a control plate 92 secured to the collar, the plate including a curved portion 93 adapted to seal the slot 90 against the entry of dust, sand, and the like. The plate is provided with a pair of holes 95 and 96 through which extends the legs 97 and 98, respectively, of an endless control cable 100.

As shown best in Figures 1, 1a and 1b, the control cable 100 extends between a horizontal sheave 101 at the inner end of the trestlework, and a horizontal sheave 102 at the outer end of the trestlework. Both of the sheaves are mounted for transverse movement with respect to the trestlework, but inasmuch as both mountings are identical, with the exception that the sheave 101 is larger in diameter than the sheave 102, only one is shown and described in detail. Thus, referring to Figures 1a and 1b, the sheave spindle 105 is journaled in suitable apertures in a pair of plates 106 and 107, the upper portion of the spindle carrying a pinion 108 engaged in a rack 109 secured to a trestlework transverse frame member 110. Three additional transverse frame members 111, 112 and 113 are secured transversely of the trestlework and provide tracks for the reception of shoe members 114, 115 and 116 welded to the plates 106 and 107. A pair of idler sheaves 120 and 121 are journaled between the end arms 122 and 123 of the plates, serving to limit the transverse spacing of the cable legs 97 and 98.

Continuing now with the description of the unit 70, in addition to the control valve assembly 75, each of these units is provided with a horizontal traveler cylinder 130 which also functions as a transverse structural member connecting together a pair of vertical angle members 131, suitable cross-bracing 132 being provided to maintain the rigidity of these parts. A stationary, hollow piston rod 133 extends through the cylinder 130 and is secured to the frame members 24 and to the conduits 22 and 23, the piston rod carrying a piston 135 closely fitting within the cylinder for longitudinal reciprocation therein.

Still referring to the master units 70, a shuttle valve assembly generally indicated 136 is provided, the valve including a cylindrical element 137 which forms a continuation of the piston rod 133, the element 137 having a cap 138 at the end thereof, a plurality of ports 139, 140, 141 and 143 in the top thereof and a plurality of ports 144, 145, 146 and 147 in the bottom thereof. The shuttle valve includes a hollow piston 150 fitting closely within the cylindrical element 137 for longitudinal reciprocation therein, the piston being provided with portions 151, 152, 153, 154 and 155 of reduced diameter for cooperation with the appropriate above-mentioned ports. A series of ports 156 extend through the piston 150 at the portion 153, and a series of ports 157 extend through the piston at the portion 155.

A piston rod 160 is secured to the end of the piston 150 by means of a spider 161, the piston rod carrying at its other end a sealing piston 162 closely fitted within the hollow piston rod 133. The piston 162 is provided with a pair of bosses 163 at either side thereof, each of the bosses carrying an actuator pin 164 extending through appropriate slots 165 in the piston rod 133.

Means are provided for preventing stoppage of the shuttle valve mechanism on "dead center" and, as shown in Figure 4, these means may include a pair of curved spring arms 170 secured to the cap 138 and adapted to cooperate with a protrusion 171 formed on the end of the cylindrical element 150.

Each of the master units 70 is provided with a lower horizontal cylinder 175, also extending between the angle members 131. A hollow conduit 176 is secured to the frame members 24, the conduit carrying a sealing piston 174 closely fitting within the cylinder 175. A pair of fluid outlet ports 178 and 179 is provided, one on either side of the piston 174.

The cylinder 175 is provided at one end thereof with a port 180 which communicates with a vertical conduit 181 which in turn communicates, through a port 182, with a horizontal conduit 183. A pair of vertical power cylinders 185 is provided, one secured to each of the angle members 131. The upper end of each of these cylinders is provided with a port 187 which communicates with the respective ends of the horizontal conduit 183.

The cylinder 175 is provided at the other end thereof with a port 190 which communicates with a second vertical conduit 191 which in turn communicates, through a port 192, with a second horizontal conduit 194. Ports 195 in the lower ends of each of the vertical cylinders 175 communicate with the respective ends of the horizontal conduit 194.

A piston 200 fits closely within each of the vertical cylinders 185 for reciprocation therein, the pistons being integral with hollow piston rods 201 which form the supporting legs for the trestlework, the foot members 35 being carried on the bottom of each pair of legs.

Valve means are provided for the control of fluid flow into the interior of the legs 201. As shown in Figure 4, these means may include a truncated valve seat portion 202 formed on the outer surface of each of the legs 201, each of the seat portions being provided with a plurality of ports 203. A valve element 204 in the shape of a truncated cone, surrounds each of the valve seats and is provided with ports 205. In the position shown in Figure 4, the valve elements are in the unseated or open position, by virtue of the fact that they are resting upon the end plugs 206 of the vertical cylinders. Upon movement of the valve seats upwardly, the valve elements become seated by gravity to shut off flow through the ports 205 and 203.

The above completes the description of the master units 70. The slave units 70a are identical with the master units in all respects, with the exception that they do not include the control valve assembly 75 and the shuttle valve assembly 136. A further exception is that the piston 135a affects a seal between not only the two ends of the cylinder 130a but extends through the hollow piston 133a and similarly seals it. However, appropriate slots, similar to 165 (not shown), are retained to provide ports between the inside of the hollow piston and that part of the cylinder 130a that surrounds it. Thus, as is indicated in Figure 4, the slave units 70a each include a horizontal traveler cylinder 130a reciprocable upon a piston 135a carried by a hollow piston rod 133a which is secured to the frame members 24. Moreover, the slave units 70a each include a lower horizontal cylinder 175a, a hollow conduit 176a carrying a sealing piston 174a, vertical conduits 181a and 191a, horizontal conduits 183a and 194a, vertical power cylinders 185a, pistons 200a and legs 201a, the legs being provided with valve means identical to those described above in connection with the legs 201.

The foot members 35 and 35a are identical and hence only the member 35 shown in Figures 9, 10 and 11 will be described in detail. As shown therein, the foot members are generally triangular in cross-section and open at the bottom to permit them to sink partially into the soil. The legs 201 extend into the interior of the foot members, terminating just above the bottom of a splash baffle or weir 210 which extends from one side of the foot member to the other.

Means are provided for limited radial movement of the trestlework with respect to the pivot post. As shown in Figures 1 and 8, these means may include a power cylinder assembly 212 comprising a cylinder 213 and a piston 214. The cylinder is provided with inlet and outlet lines 215 and 216 for hydraulic fluid, and is pivotally connected to the pivot post by means of a collar bracket 217 and a pivot pin 219. The piston rod 220 is pivotally connected to a transverse frame member 221 by means of a bracket 222 and pin 223.

In operation of the device thus far described, irrigation water from the well head 46 is fed from the pivot post 30 and cap member 42 into the upper conduit 25. If desired, suitable equipment (not shown) may be installed in the pit 31 for mixing nutrients, growth controls, insecticides, etc., with the water, and for heating the water or otherwise conditioning it. The pump is actuated to pump water or other hydraulic pressure fluid into the conduits 22 and 23, the pressure in the conduit 22 preferably being relatively higher than that in the conduit 23.

Referring now particularly to Figure 4, it will be understood that with the piston 76 of the control valve 75 in the solid line position shown, the valve is closed and there is no flow of fluid either from the conduit 23 through the line 87 or from the conduit 22 through the line 230 which connects with the port 79. Thus, all of the units 70 and 70a are stationary. The units are actuated by manually moving either of the legs 97 or 98 of the control cable longitudinally with respect to the trestlework. For example, assuming that it is desired to cause the trestlework to move in a counter-clockwise direction (looking down from the top), the cable leg 97 is moved in a direction toward the pivot post or the cable leg 98 is moved in the opposite direction, whichever is most convenient for the operator. In either event, the sheaves 101 and 102 will thus be rotated in a counter-clockwise direction, causing both of them, by means of the rack and pinion mounting, to be moved bodily with respect to the trestlework in a transverse, counter-clockwise direction.

The cable legs 97 are thus shifted to the right as seen in Figure 4, carrying with them the plate 92 and the piston 76. This, in turn, causes the left-hand port 83 in the piston to be brought into communication with the split 85 in the cylinder 74 and, in turn, with the port 86, admitting pressure fluid from the line 87 into the interior of the hollow piston 76. It will be noted that the triangular-shaped ports 83 prevent a quick surge of the fluid into the piston and function as metering valves.

The pressure fluid fills the piston 76 and cylinder 74 and emerges therefrom out of the open port 88, thence through the line 231 and into the interior of the shuttle valve 136 via the ports 141 and 156. Continued flow of fluid therethrough fills one end of the interior of the hollow piston rod 133 and, through the ports 165, one end of the interior of the traveler cylinder 130. The pressure of the fluid, acting against the piston 135 and the left-hand end of the traveler cylinder, causes the cylinder to be moved to the left in Figure 4, relative to the piston rod 133 and the trestlework to which it is attached. It will be noted that the pistons 200 of the master units 70 are in the "down" position, meaning that the foot members 35 are in contact with the ground and are stationary. Hence the traveler cylinder, which is attached indirectly to the foot member, is here actually stationary, and the piston rod 133 is moved. Thus, at this stage in the operation, the entire trestlework is being moved bodily in a counter-clockwise direction (to the right as seen in Figure 4). It should be understood that the above-described operation with respect to the control valve 75 and the traveler cylinder 130, etc., takes place similarly in all of the units 70.

A line 235 maintains communication between the end of the hollow piston rod 133 opposite the shuttle valve and the corresponding end of the hollow piston rod 133a forming a part of the slave unit 70a which is paired with the particular master unit 70 seen in Figure 4. Pressure fluid is sealed, in the line 235 and piston rods 133 and 133a, between the right-hand side of the pistons 135 and 162, and the equivalent parts of the slave unit 70a, including the piston 135a. Here, however, inasmuch as the pistons 200a are in the "up" position, the foot member 35a is free of the ground, and hence the traveler cylinder 130a is free to advance upon the piston rod 133a toward the right as seen in Figure 4, and to carry with it the associated foot member.

Still assuming that the piston rod 76 is moved to the right as seen in Figure 4, in addition to opening one of the ports 83 with the results described above, the reduced portion 77 of the piston rod 76 is also moved to the right, opening and establishing communication between the ports 79 and 78. This permits flow of pressure fluid from the conduit 22 through the line 230, through the ports 79 and 78 and thence through the line 240, to the shuttle valve 136. The fluid enters through the port 140 and exits through the port 146. The fluid then passes through the line 241 into the end of the hollow conduit 176a of the slave unit 70a, from whence it is diverted through the vertical conduit 191a and horizontal conduit 194a, and then into the vertical cylinders 185a to act against the pistons 200a to maintain the legs 201a and associated foot members 35a in the elevated or "up" position.

The line 242 maintains communication between the right-hand end of the hollow conduit 176 (as seen in Figure 4) and the same end of the hollow conduit 176a.

Pressure fluid is sealed in the line 242 and extends, at this stage of the operation, through the port 179 into the right-hand side of the lower horizontal cylinder 175, thence through the port 180 into the vertical conduit 181, thence through the port 182 and into the horizontal conduit 183. The fluid passes through the ports 187 at the ends of the conduit 183 and into the horizontal cylinders 185 to maintain the pistons 200 in the "down" position. At the slave unit 70a, the sealed fluid in the line 242 extends through the right-hand side of the conduit 176a up to the sealing piston 174a, thence through the vertical conduit 181a, into the horizontal conduit 183a and through ports (not shown) corresponding to the ports 187, into cylinder 185a above the pistons 200a. It will be apparent from the following description that the high pressure fluid from the conduit 22 functions to elevate the pistons 200a and their associated parts, including the foot members 35a.

Still with the hollow piston 76 moved to the right as seen in Figure 4, it will be seen that the reduced portion 77a of the hollow piston 76 is moved to the right, opening and establishing communication between the ports 80 and 81. The line 245 extends between the left end of the hollow piston rod 133a of the slave unit 70a and the port 147 of the shuttle valve 136. It will be recalled, as described above, that at this stage of the operation the traveling cylinder 130a is being moved to the right with respect to the piston rod 133a and hence pressure fluid contained between the left side of the cylinder 130a and the piston rod 133a is being discharged from the left side of the hollow piston rod 133a. The fluid passes into the line 245 and then through the ports 147 and 143. This fluid then feeds through a line 250. This line branches into lines 251 and 252, and the fluid exhausts through the line 251 into the upper conduit 25.

Fluid from the line 250 and the irrigation fluid from the line 251 passes into the line 252 and then through the ports 81 and 80 of the control cylinder 74. The fluid then enters a line 255 extending between the port 80 and the port 139 of the shuttle valve 136. The fluid then passes through the ports 139 and thence through the port 145. From the port 145 the fluid feeds through a line 256 into the hollow conduit 176. The fluid emerges therefrom through the port 178, into the lower horizontal cylinder 175, thence through the port 190, vertical conduit 191, port 192, and into the horizontal conduit 194. The fluid fills the horizontal conduit 194 and passes from each end thereof through the ports 195 into the cylinders 185.

As indicated above, the pistons 200 being in the "down" position, the ports 203 of the associated valve means are "open" and the fluid from the conduit 194 and ports 195 flows through the ports 205 and 203 and thence downwardly through the hollow legs 201. As indicated in Figures 10 and 11, this fluid may then overflow from the weirs 210 in the foot members to be utilized as irrigation fluid.

Upon continued movement of the hollow piston rod 133 and its associated piston 135 to the right as seen in Figure 4 as described above, the protruding portion of the traveler cylinder end wall 260 contacts the right-hand actuator pin 164, continued relative movement causing the actuator pin and the associated piston rod 160 to be moved to the left as seen in Figure 4. At this point in the operation, the trestlework has been moved the maximum distance to the right (or counter-clockwise) relative to the foot members 35 of the master units 70, and the leftward movement of the piston rod 160 is adapted to energize the shuttle valve 136 to reverse the direction of relative longitudinal movement of the traveled cylinders 130 and 130a with respect to the associated hollow piston rods 133 and 133a, respectively. Thus, as the piston rod 160 is moved to the left, the hollow piston 76 still being in the rightward position, pressure fluid from the conduit 23 continues to be fed through the hollow piston, out the port 88, into the line 231 and through the port 141. Now, however, with the piston rod 160 in the left-most position, the ports 141 and 147 are in communication so that the fluid flows from the port 147 into the line 245 and thence into the hollow piston 133a of the slave unit 70a. This pressure fluid then enters traveler cylinder 130a on the left side of the piston 135a, as seen in Figure 4, causing the traveler cylinder 130a and its associated parts to be moved to the left. At the same time, the sealed pressure fluid in the traveler cylinder 130a on the right side of the piston 135a will begin to be exhausted into the hollow piston 133a to act, through the line 235, upon the volume of the traveler cylinder 130 defined between the piston 162 and the traveler cylinder end wall 260, to tend to force the traveler cylinder to the right as seen in Figure 4.

Simultaneously with the establishment of communication between the ports 141 and 147 as described above, the leftward movement of the piston rod 160 brings the ports 140 and 145 into communication by means of the reduced portion 152. High pressure fluid continues to flow from the conduit 22 into the line 230, through the ports 79 and 78, into the line 240 and thence through the ports 140 and 145. This high pressure fluid then proceeds through the line 256 and into the conduit 176, thence through the port 178 into the lower horizontal cylinder 175. This high pressure fluid continues through the port 190 into the vertical conduit 191, through the port 192 into the horizontal conduit 194. It is then discharged from both ends thereof through the ports 195.

As pointed out above, the foot member 35 of the master unit 70 is in the ground-contacting position during movement of the traveler cylinder 130 relatively to the left. During this sequence of the operation, the pressure of the high pressure fluid acting under the pistons 200a is sufficient to maintain the pistons in the "up" position against the combined weight of the pistons 200a and the legs 201a, and the weight of that portion of the trestlework which is resting on the foot member 35. However, upon reversal of the direction of relative longitudinal movement of the traveler cylinders 130 and 130a with respect to the associated hollow piston rods 133 and 133a, respectively, as described above, the high pressure fluid in the lower end of cylinders 185a is free to exhaust through the horizontal conduit 194a, vertical conduit 191a, conduit 175a, and line 241. The fluid then proceeds through the ports 144 and 139, through the line 255, through ports 80 and 81, through the line 252 and line 251 to be exhausted into the conduit 25. The pistons 200 are then free to move upwardly under the weight of the adjacent portion of the trestlework, to seat the valves 204. The high pressure fluid discharging from the conduit 194 then acts upon the pistons 200 to move them upwardly, displacing the fluid sealed between the top of the pistons 200 and the top of the pistons 200a into the cylinders 185a. This, together with the weight of the pistons 200a and their associated parts causes the pistons 200a to be moved downwardly.

Upon completion of the stroke of the pistons 200, the positions of the foot members 35 and 35a will be reversed, with the foot member 35 then being in the raised position and the foot member 35a being in the "down" ground-contacting position, and the weight of the portion of the trestle in the vicinity of the particular slave unit 70a will then be upon the foot member 35a. The trestlework structure is sufficiently flexible to accommodate this simultaneous upward and downward movement of the respective foot members 35 and 35a so that at the point wherein both foot members of the particular master-slave pair are at the same elevation with respect to the trestlework, they will be in contact with the ground, the portion of the trestlework adjacent the pair being capable of sagging downwardly a sufficient distance to accomplish this result. In actual practice, a downward sag of the trestlework in the neighborhood of about three inches is all that is required. It will be understood that generally the plurality of pairs of master-slave units will not operate in synchronism such that all of the foot members 35 and all of the foot members 35a would be moving vertically at the same time. However, in the event that this synchronous condition might prevail for a limited period of time, the pivotal connection of the trestlework to the pivot post 30 would accommodate the slight movement of the trestlework bodily in the vertical direction.

With the foot member 35 in the "up" position and the foot member 35a in the "down" position, the sequence of operations is merely the reverse of that described above, to complete the cycle. From this description it will be understood that so long as the hollow piston 76 is in the rightward position, as shown in Figure 4, this cycle will be continuously repeated to move the entire trestlework continuously in a counter-clockwise direction, the foot members 35 and 35a in effect "walking" the entire trestlework around the pivot post 30. The sequence of operations is illustrated diagrammatically in Figures 5, 6 and 7.

It will be understood that, as the trestlework pivots about the post 30, the outer foot members must move relative to the trestlework at a faster rate of speed than each succeeding inward foot member. This is accomplished to a degree by the fact that, as pointed out above, the diameter of the inner sheave 101 is greater than that of the outer sheave 102. Consequently, as the control cable 100 is moved longitudinally of the trestlework to actuate the control valve 75, the outer sheave 102 will be moved transversely of the trestlework a greater distance than the inner sheave 101. Thus, the legs 97 and 98 of the control cable will describe a slight angle with respect to the longitudinal center line of the trestlework, and the control plates 92 of each of the master units 70 will be moved by the control cables in varying degrees depending upon the relative positions of the control plates 92 with respect to the pivot point of the trestlework. With this arrangement, the extent of opening of the control valves 75 will progressively increase from the inner end to the outer end of the trestlework, and the relative speed of actuation of the master units will be accordingly varied to accommodate the circular motion of the trestlework. Most important, however, is the fact that the control cable 100 automatically maintains the proper relationship of the various master and slave units during the operation. Thus, if any one unit assumes a position slightly out of line with respect to the other units, the cable will cause the particular throttle valve to slide in such a way as to retard or accelerate that particular unit and to restore it to proper alignment. It will be noted that the control cable provides a means of manual control which is available through the entire elongated trestlework.

The trestlework, by proper manipulation of the control cable, may be caused to move in an entire circle or in any desired limited arc. It will be understood that during one full or partial rotation of the trestlework, only the strips of soil upon which the foot members 35 and 35a fall receive the irrigation water or other soil conditioning fluid dispensed through the foot members. Accordingly, in order to provide means for directly contacting every particle of soil within the arc of the trestlework, without the requirement for a prohibitively large number of master and slave units, the trestlework is connected, as described above, for longitudinal or radial movement with respect to the pivot post 30. Accordingly, after completion of the circle or arc, the power cylinder assembly 212 is actuated to move the piston 214 outwardly with respect to the cylinder 213, thus moving the entire trestlework radially outwardly from the pivot post. During this movement, the foot members 35 may be in contact with the ground, as shown in Figure 1, and in such case the flexibility of the master units 70 is such that the entire units pivots about the respective foot members 35, as indicated by the phantom lines in Figure 1. The slave units 70a are merely translated horizontally, also as indicated by the phantom lines in Figure 1, so that upon continued operation the respective foot members 35 and 35a will be moved outwardly with respect to their former positions to describe, in their travel about the pivot post, a second series of soil strips overlapping or closely adjacent the first series of strips. With each revolution of the trestlework, the trestlework is moved outwardly in this manner until the entire ground area is covered. If it is desired to move the trestlework in a clockwise direction rather than the counter-clockwise direction described above, the movement of the cable legs 97 and 98 is simply reverse; that is, in such case the cable leg 97 is moved in a direction away from the pivot post or the cable leg 98 is moved in the opposite direction, whichever is more convenient for the operator. The sequence of operations is merely the reverse of that described above.

A modified form of the invention is shown in Figures 12 and 13. In this form, the trestlework is again generally indicated 20, since it is identical with that described above, including master units 70 and slave units 70a. Here, however, the device incorporates a cab structure generally indicated 300, utilized for the transportation of personnel and equipment, and a land leveling sled assembly generally indicated 305. The cab comprises a generally triangular body formed of suitable frame members 310, 311 and 312, and a plurality of upper flanged wheels 315 are journaled in suitable bearing supports 316 depending from the frame member 312, and these wheels ride on the trestlework track 21. A pair of sets of lower flanged wheels 320 and 321 are provided on each side of the cab suitably journaled in bearing assemblies 322 and 323. The wheels 320 ride upon the conduits 22, and the wheels 321 ride upon the conduit 23. Power means are provided for moving the cab 300 relative to the trestlework and, as shown in Figures 12 and 13, these means may include an electric motor 330 supported on the frame member 312, and a chain transmission 331 extending between the motor and the central wheel 315.

The electric motor may be arranged to pick up energy from conductors (not shown) mounted through insulators (not shown) on the trestlework, and this electrical energy can be made available along the trestlework for devices such as electrostatic plant growth and pest control, search lights, harvesting equipment, etc. (not shown).

From the above description it will be understood that the cab 300 is adapted to be propelled longitudinally throughout substantially the entire length of the trestlework, providing for transportation of personnel, seeds, plants, harvested crops, plant foods, insecticides and as a mobile platform for cultivating equipment, all with a minimum of disturbance to the stability of the soil surface. The cab also serves as a base from which land clearing, soil planing, plowing, cultivating and other soil conditioning or tilling apparatus can be operated. Additionally, the cab provides a structure from which land leveling monitors, auxiliary heads and other sprinkling devices can be operated, and it provides a means for detailed crop condition inspection and for safeguarding against pests and trespassers.

The land leveling sled assembly 305 includes a ground-contacting sled 350 and a scraper shovel 351, the shovel being pivotally connected to the sled by means of a bracket plate 352 secured to the sled and a pivot pin 353 suitably journaled in a bearing 354. A power cylinder assembly 355 is provided for operation of the shovel 351. As shown in Fig. 12, this assembly comprises a cylinder 360 pivotally connected at the upper end thereof by means of a pin 361 to the sled 351, a piston (not shown) and a piston rod 370 pivotally connected at its lower end by means of the pin 371 to the bracket plate 352.

Means are provided for moving the sled longitudinally with respect to the trestlework and, as shown, in Figures 1, 3, 12 and 13, these means may include an electric motor 380 secured to the pivot pit foundation 32, the drive shaft 381 of the motor carrying a gear 382 engaged with an internal gear 383 carried on an annular sheave member 385. The sheave member 385 is mounted for horizontal rotation on the foundation braces 33 by means of a plurality of curved bearing members 390 which are welded or otherwise secured to the braces 33. Supported between the conduits 22 and 23 at the outer end of the trestlework is a transverse I beam member 391, which member extends outwardly from each side of the trestlework. Secured to each of the outer ends of the I beam member 391 is a second I beam member 392, each of which members 392 carries a block 393. A cable 394 extends from the forward end of the sled 350 to and around the sheave 385 and thence returns, parallel to the trestlework to the outer end thereof, through the block 393 positioned on that side of the trestlework, thence across the trestlework and through the block 393. The end of the cable 394 is secured to the sled 350 behind the shovel 351. From this description it will be understood that the land leveling sled assembly 305 may be moved longitudinally of the trestlework by means of the powered sheave 385. As the trestlework is rotated about the pivot post as described above, the sled will be pulled along therewith. The sled assembly may be positioned on either side of the trestlework, depending upon the desired direction of rotation of the trestlework.

The sled assembly provides means for clearing and grading virgin land and for periodically restoring grade lines. Although pieces of equipment may be towed in a circular path about the pivot post, the longitudinally operable sled assembly provides a more rugged source of power for land conditioning. Additionally, it provides a handy means for effectively clearing a field of harvest refuse, and for heaping combustibles thereon for burning or other disposal operations. It will be understood that in place of the sled assembly 350, other land tilling devices may be used.

Having fully described my invention, it is to be understood that I do not wish to be limited to the details set forth, but my invention is of the full scope of the appended claims.

I claim:

1. In an agricultural implement, the combination of a pivot post anchored to the ground; an elongated trestlework operably connected to said pivot post for rotation in a generally horizontal plane thereabout; a plurality of pairs of support and propulsion units operably connected to and supporting said trestlework in spaced relation with the ground; each of said pairs of units including a master unit and a slave unit; each of said units including a ground-contacting foot member; and hydraulic fluid means for individually actuating said pairs of units for transverse and vertical movement of said units with respect to said trestlework to produce a walking movement of each of said pairs of units, said means including a control valve for each of said master units, means for simultaneously actuating each of said control valves, and means interconnecting each slave unit with its paired master unit for simultaneous actuation of said paired slave units and master units.

2. In an agricultural implement, the combination of a pivot post anchored to the ground; an elongated trestlework operably connected to said pivot post for rotation in a generally horizontal plane thereabout; a plurality of pairs of support and propulsion units operably connected to and supporting said trestlework in spaced relation with the ground; each of said pairs of units including a master unit and a slave unit; each of said units including a ground-contacting foot member; and hydraulic fluid means for individually actuating said pairs of units for transverse and vertical movement of said units with respect to said trestlework to produce a walking movement of each of said pairs of units, said means including a control valve for each of said master units, a pair of sheaves, one at each end of the trestlework, an endless cable extending longitudinally of said trestlework between said sheaves and operably connected to each of said control valves for simultaneous actuation and alignment thereof, and means interconnecting each slave unit with its paired master unit for simultaneous actuation of said paired slave units and master units.

3. In an agricultural implement, the combination of a pivot post anchored to the ground; an elongated trestlework operably connected to said pivot post for rotation in a generally horizontal plane thereabout; a plurality of pairs of support and propulsion units operably connected to and supporting said trestlework in spaced relation with the ground; each of said pairs of units including a master unit and a slave unit; each of said units including a ground-contacting foot member; and hydraulic fluid means for individually actuating said pairs of units for transverse and vertical movement of said units with respect to said trestlework to produce a walking movement of each of said pairs of units, said means including a control valve for each of said master units, a pair of sheaves, one at each end of the trestlework, and endless cable extending longitudinally of said trestlework between said sheaves and operably connected to each of said control valves for simultaneous actuation and alignment thereof, said sheaves being mounted on said trestlework for movement transversely of said trestlework in response to rotation of said sheaves, the sheave at the inner end of said trestlework being larger in diameter than the other sheave, and means interconnecting each slave unit with its paired master unit for simultaneous actuation of said paired slave units and master units.

4. The combination set forth in claim 2, wherein each sheave is provided with a spindle having a pinion thereon, and wherein the trestlework is provided with a pair of racks, one rack for each pinion.

5. In an agricultural implement, the combination of a pivot post anchored to the ground, an elongated trestlework operably connected to said pivot post for rotation in a generally horizontal plane thereabout, a plurality of pairs of support and propulsion units operably connected to and supporting said trestlework in spaced relation with the ground, each of said units including a ground-contacting foot member, means for individually actuating said pairs of units for transverse and vertical movement of said units with respect to said trestlework to produce a walking movement of each of said pairs of units wherein each foot member is intermittently in contact with the ground, and means for applying a soil conditioning fluid through said foot members during the intervals when said foot members are in the ground-contacting position.

6. In an agricultural implement, the combination of a pivot post anchored to the ground, an elongated trestlework operably connected to said pivot post for rotation in a generally horizontal plane thereabout and for limited pivotal movement in a vertical plane, a plurality of support and propulsion units operably connected to and supporting said trestlework in spaced relation with the ground, each of said units including a ground-contacting foot member, means for individually actuating said units for propulsion of said trestlework about said pivot post, a personnel and equipment-carrying cab mounted on said trestlework, and means for moving said cab from one end of said trestlework to the other.

7. In an agricultural implement, the combination of a pivot post anchored to the ground, an elongated trestlework operably connected to said pivot post for rotation in a generally horizontal plane thereabout, a plurality of pairs of support and propulsion units operably connected to and supporting said trestlework in spaced relation with the ground, each of said units including a ground-contacting foot member, means for individually actuating said pairs of units for transverse and vertical movement of said units with respect to said trestlework to produce a walking movement of each of said pairs of units wherein each foot member is intermittently in contact with the ground, control means incorporated with said actuating means for varying the speed of travel thereof for maintaining alignment of said pairs of units, and means for applying a soil conditioning fluid through said foot members during the intervals when said foot members are in the ground-contacting position.

References Cited in the file of this patent

UNITED STATES PATENTS

| | | |
|---|---|---|
| 910,927 | Konter | Jan. 26, 1909 |
| 1,085,609 | Heath | Feb. 3, 1914 |
| 1,197,534 | Norton | Sept. 5, 1916 |
| 1,419,925 | Heine | June 20, 1922 |
| 2,604,359 | Zybach | July 22, 1952 |